Aug. 7, 1962  G. ERLEBACHER  3,048,641
THERMOCOUPLES
Filed Aug. 21, 1961
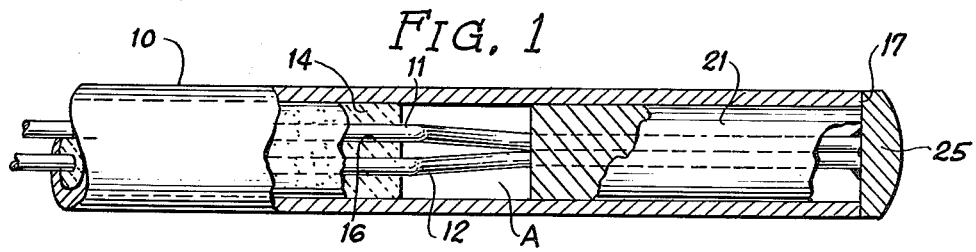
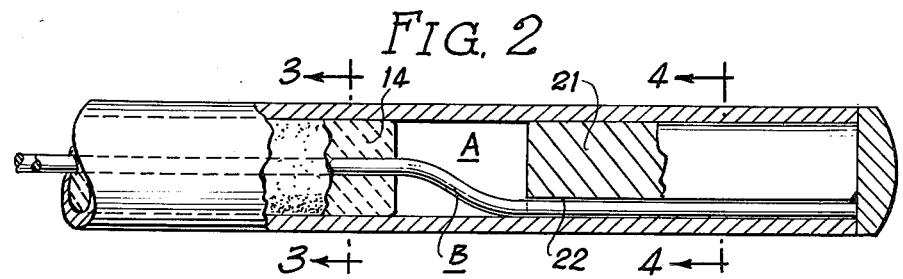
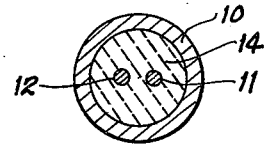
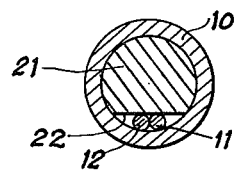
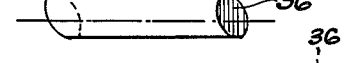
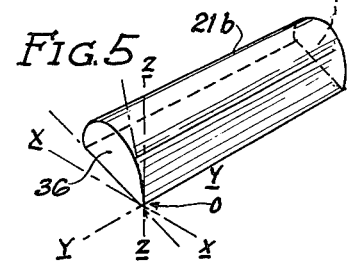
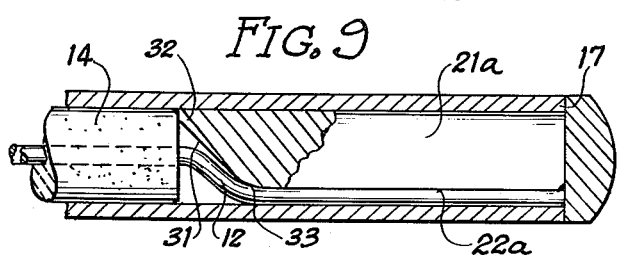
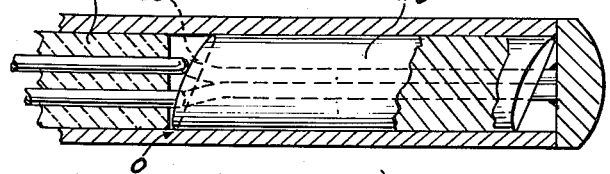
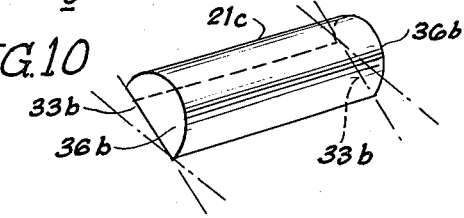
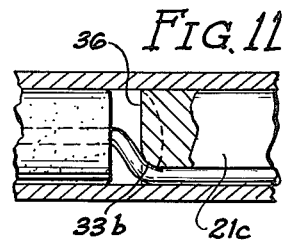
INVENTOR.
Gunther Erlebacher
BY Leonard S. Knox
Atty

United States Patent Office 3,048,641
Patented Aug. 7, 1962

3,048,641
THERMOCOUPLES
Gunther Erlebacher, Morton Grove, Ill., assignor to Aero Research Instrument Co., Inc., Chicago, Ill.
Filed Aug. 21, 1961, Ser. No. 134,044
8 Claims. (Cl. 136—4)

This invention relates to thermocouples. More specifically it has reference to an improved tip construction therefore by means of which a reliable junction may be achieved between a pair of thermocouple wires of comparatively fine gauge. However, the invention is not to be regarded as limited by the gauge of the wires.

The fabrication of thermocouple junctions consisting of wires which are subject to embrittlement upon heating is fraught with many practical difficulties. For example, wires of tungsten and tungsten-rhenium alloy will, when heated as in a welding operation, become brittle and, therefore, a welded junction may not be relied upon. As the diameter of the wires is reduced the severity of the problem increases.

The instant invention has, for its principal object, the provision of means for obtaining reliable mechanical contact between wires forming a thermocouple junction.

Another object is to provide a mechanical junction, as aforesaid, of a character which avoids the application of such forces on the wire as may give rise to mechanical failure.

Still another object is to provide a mechanical junction as aforesaid which, when desirable, lends itself to sealing of the otherwise open, tip end of the thermocouple assembyl by a welding or soldering operation without those harmful heating effects which the mechanical junction is intended to avoid.

Other objects and advantages of the invention will become apparent from the ensuing description which, taken with the accompanying drawing, discloses certain preferred forms which the invention may assume in practice.

In this drawing:

FIG. 1 is a combined sectional and top plan view of the tip end of a thermocouple showing the improved junction of the invention;

FIG. 2 is a combined sectional and side elevational view thereof;

FIG. 3 is a cross section taken on the plane 3—3 of FIG. 2;

FIG. 4 is a cross section taken on the plane 4—4 of FIG. 2;

FIG. 5 is an isometric view of an alternative form of the plug constituting one element of the invention;

FIG. 6 is a top plan view of the element of FIG. 5;

FIG. 7 is a side elevational view of the element of FIG. 5;

FIG. 8 illustrates an alternative form of the invention including the plug of FIG. 5;

FIG. 9 illustrates another alternative form of plug in assembled condition;

FIG. 10 is an isometric view of still another form of plug; and

FIG. 11 illustrates the plug of FIG. 10 as assembled.

Broadly regarded the invention comprises a thermocouple assembly in which the wires thereof are enclosed in a metallic sheath, usually cylindrical, together with a suitable electrically-insulating, refractory material to space the wires apart and away from the sheath, and to provide mechanical support therefor. The refractory material is terminated short of the end of the sheath and a plug, preferably in the form of a longitudinally truncated cylinder is inserted into the open end of the sheath in such fashion that the thermocouple wires are caused to occupy the segmental space defined between the flat side of the plug and the interior of the sheath. The plane of truncation is so chosen with reference to the opposite interior wall surface of the sheath that the wires are brought into contiguous relation and snugly wedged between the flat side of the plug and such wall surface whereby an efficient mechanical junction of the wires is achieved. The principles of the invention are applicable also to a sheath which has other than a cylindrical interior configuration, in which the plug will be so conformed relative to such interior and to the wires as to result in intimate pressure contact of the wires forming the junction. It is within contemplation to define the space between the plug and sheath other than as a longitudinal cylindrical segment, e.g. by a cutting plane or planes for the cylinder which are not necessarily flat. For conciseness in this description and in the claims the words "plane of truncation" are intended to comprehend surfaces which are other than a single flat plane.

If protection of the otherwise open end of the tip of the thermocouple is desired the end of the sheath may be closed by welding or soldering thereby supplementing what may be conveniently termed the "pressure" junction aforesaid.

In one of its aspects the invention comprehends a plug which is so conformed at its entering end as to avoid pinching or scoring of the wires in the zone intermediate the plug with refractory material and possible subsequent rupture of the wires.

In another aspect the plug is so conformed not only to avoid the pinching or scoring action aforesaid but also to provide for smooth transition or bending of the wires from the place of exit from the refractory material, viz. substantially on a diametrical plane of the sheath, to the offset position occupied thereby between the plug and sheath.

In still another aspect the plug may be made of the desired foolproof form at both ends whereby either end may be inserted into the sheath with no possibility of inadvertent reversal and sacrifice of the desired function of the inner end.

The invention has particular application to miniaturized thermocouples for specialized applications, e.g. for installation in supporting or flow tubes or conduits of very small diameter. By way of example one type of thermocouple in which the invention has been successfully embodied has a molybdenum sheath having an outside diameter of from 0.045" to 0.050", or approximately 3/64", and an inside diameter of from 0.035" to 0.040" or approximately 1/32". The pair of wires are tungsten and tungsten—26% rhenium of No. 36 gauge (0.005" dia.).

Turning now to FIGS. 1 to 4 there is shown, by way of example, a metallic sheath 10 of any suitable metal, e.g. molybdenum of any desired over-all length, in the form of a hollow cylinder. Other cross sections may be availed of within the broad concept, and such cross section may be different over the tip end and the remainder of the sheath, regarded in terms of transverse dimensions and/or peripheral configurations.

The thermocouple wires 11 and 12 are spaced apart and electrically insulated from each other and the sheath 10 by means of any well-known refractory material, e.g. molded pellets 14 of beryllia or other ceramic or densely compacted magnesium oxide powder or its equivalent. In the case of ceramic pellets the same will be provided with axial bores 16 through which the wires are threaded. In practice, because of the constant hazard of fracture of these small diameter, brittle components, a plurality of pellets are employed. The insulation 14 is terminated short of the end 17 of the sheath; in the example, by a distance of approximately 3/8".

Inasmuch as the fit of the plug within the sheath is fairly snug it is desirable to prevent buckling of the wires 11 and 12 during insertion thereof. Accordingly, the thermocouple wires are brought out beyond the end 17 of the sheath a sufficient distance to be gripped by pliers and held reasonably taut while the plug 21 is inserted.

In the example the plug 21 is of molybdenum having a length if ¼″ so that when the same is inserted to be flush with the end 17 a space A remains to accommodate the offset B necessarily imparted to the wires in their transitional passage from a diametrical plane of the sheath to the segmental space between the plug and sheath.

As seen in FIG. 4 the plug 21 of the example is constituted as a longitudinally truncated cylinder of 0.036″ diameter having a plane of truncation or face 22 spaced 0.032″ from the outer curved surface farthest from such plane. The segmental space defined between the face 22 and the interior, arcuate wall surface of the sheath is so computed as to cause the wires 11 and 12 to be brought into contiguous relation throughout at least the length of the plug 21, and with such pressure and intimacy of contact as to insure establishment and maintenance of a reliable thermoelectric junction.

While the junction as just described is sufficient of itself it may be desirable to seal the end 17 by swaging, soldering or welding. In the latter two cases the heat must be carefully controlled to localize the same at the extreme end of the assembly in order to avoid embrittlement of the wires as alluded to above. Such weld, indicated at 25, may be best accomplished by the well-known "Heliarc" technique. It is to be noted that the weld or solder will inevitably penetrate slightly inwardly of the end 17 whereby to supplement the junction heretofore described, although such supplementation is not regarded as an essential feature of the invention.

The plug is preferably fabricated of the same metal as the sheath or of one compatible therewith to permit fusion of the two without the introduction of foreign, i.e. possibly deleterious materials.

As a matter of good production practice it is desirable to arrange that the degree of entry of the plug 21 be limited in a foolproof manner. To this end (FIG. 9) the plug 21a may be made longer than in FIG. 1 and the inner end of the same cut on an inclined plane 31 to present a tip 32 abutting the end of the material 14. By virtue of this alternative the operative need exercise no special care when thrusting in the plug, since its overall length is calculated to provide the necessary flush relation with the sheath 10 at the end 17 thereof. It will be noted that the angle of the surface 31 is such as to cause the required offset of the wires 11 and 12 in a gradual manner. Moreover it is preferred to round the plug at the intersection of the faces 22a and 31, as indicated at 33, to avoid sharp bends at this region.

Another embodiment including the advantages pointed out in connection with FIG. 9 is illustrated in FIGS. 5 to 8. In this case the plug 21b is terminated at one or both ends in a skew plane 36 which is inclined as shown. Regarding the three axes through the point O as the spatial coordinate axes of geometry such plane 36 (as extended) may be defined as being inclined to intercept the X— and Y— plane and the Y+ and Z+ plane in the manner shown. In the example, the angle of the intercept with the X— axis is approximately 15° and with the Z+ axis approximately 15°. Such angles may vary depending upon the clearance required to receive the offsets B in the wires 11 and 12. Desirably both ends of the plug are made identical in order that the operative need not concern himself with inserting a particular end foremost, it being recalled that the exemplificative plug is only ¼″ long and $\frac{1}{32}$″ diameter more or less, so that the inclination of the innermost face thereof is not too clearly evident upon casual inspection. Thus, assuming the bias or skew cut on one end only with the other end at right angles to the longitudinal axis, and a part as small as that of the example it is to be anticipated that the average operative might reverse the part end to end unintentionally and thereby produce an assembly having only scrap value. FIGS. 6 and 7 have been included to clarify the isometric representation of FIG. 5 and, in these figures, the slope of the terminal truncations or skew planes has been intentionally exaggerated for clarity.

From FIG. 8 it will be seen that the corner O serves as a limit stop for the plug by abutment with the termination of the material 14; the angle of the intercept with the X—Y plane provides clearance for the wires exiting from the material 14 and the angle of the intercept with the Y—Z plane provides clearance for the offset B.

The modified plug 21c of FIGS. 10 and 11 is similar to that of FIG. 5 except that in this case the angle of intercept with the Z+ axis is 0°. In this instance accommodation of offset may be realized by rounding of the corner 33b. Moreover, in this alternative both ends 36b may be identical for the reasons given in connection with FIG. 5.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

I claim:

1. A thermocouple comprising a cylindrical sheath, a plurality of wires comprising metals constituting a thermoelectric junction at the working end of the thermocouple located in said sheath, electrically-insulating, refractory material interposed between said wires and between said wires and sheath to establish non-conducting relation therebetween, said material terminating at the junction end of the thermocouple short of the end of said sheath and the wires continuing at least to the said end, and a plug positioned within said sheath beyond the said termination of said material, said plug having the form of a longitudinally truncated cylinder of a diameter snugly fitting the internal diameter of the sheath, the plane of truncation together with the interior of the sheath defining a space corresponding to a longitudinal segment of a cylinder, said wires being confined in said space in contiguous relation with each other for thermoelectric effect.

2. The combination in accordance with claim 1 further characterized by a fused closure spanning said end of said sheath.

3. The combination in accordance with claim 1 further characterized in that the extreme end of the sheath, plug and wires are a swaged joint.

4. The combination in accordance with claim 1 in which the length of said plug is less than the distance between the termination of said material and the end of the sheath to define a clearance space between said material and plug to receive the offset in the wires in their transitional passage from said material to the segmental space defined between the plug and sheath.

5. The combination in accordance with claim 1 further characterized in that the interior end of said plug is skewed relative to the longitudinal axis of the plug, said skewed end thereby presenting a corner to abut the termination of the said material to define a clearance space between said material and plug to receive the offset in the wires in their transitional passage from said material to the segmental space defined between the plug and sheath.

6. The combination in accordance with claim 5 further characterized in that both ends of the plug are identically skew-surfaced and mutually parallel.

7. The combination in accordance with claim 1 wherein the interior end of the plug at the intersection between said end and plane of truncation is rounded off to avoid damage to the wires.

8. A thermocouple comprising a sheath, a plurality of wires constituting a thermoelectric junction positioned within said sheath, electrically-insulating, refractory material interposed between said wires and between said wires and sheath to establish non-conducting relation therebetween, said material terminating short of one end of the sheath to define a space within said sheath, said wires continuing at least to said end of said sheath, and plug means in said space frictionally positioned between said wires and sheath to force said wires into contiguous relation to constitute the thermoelectric junction adjacent said end.

References Cited in the file of this patent
UNITED STATES PATENTS

| | | |
|---|---|---|
| 2,466,175 | Kretsch et al. | Aug. 5, 1949 |
| 2,526,112 | Biggle | Oct. 17, 1950 |
| 2,609,406 | Barsy | Sept. 2, 1952 |